(12) United States Patent
Leonard et al.

(10) Patent No.: US 7,349,567 B2
(45) Date of Patent: Mar. 25, 2008

(54) METHOD AND APPARATUS FOR DETERMINING ANGULAR POSE OF AN OBJECT

(75) Inventors: Patrick F. Leonard, Ann Arbor, MI (US); Mark Singer, Tualatin, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 606 days.

(21) Appl. No.: 10/794,907

(22) Filed: Mar. 5, 2004

(65) Prior Publication Data

US 2005/0196036 A1 Sep. 8, 2005

(51) Int. Cl.
*G06K 9/00* (2006.01)
*G06K 9/36* (2006.01)

(52) U.S. Cl. ............ 382/151; 382/289
(58) Field of Classification Search ........ 382/151, 382/289, 290
See application file for complete search history.

(56) References Cited

U.S. PATENT DOCUMENTS

| | | | | |
|---|---|---|---|---|
| 4,497,066 | A * | 1/1985 | Gasparri, Jr. ............. | 382/289 |
| 4,736,437 | A * | 4/1988 | Sacks et al. ............. | 382/216 |
| 4,817,184 | A * | 3/1989 | Thomason et al. ......... | 382/141 |
| 4,876,549 | A * | 10/1989 | Masheff ................... | 342/417 |
| 4,922,543 | A * | 5/1990 | Ahlbom et al. ........... | 382/291 |
| 5,060,276 | A * | 10/1991 | Morris et al. ............ | 382/151 |
| 5,185,811 | A * | 2/1993 | Beers et al. ............. | 382/151 |
| 5,495,535 | A * | 2/1996 | Smilansky et al. ........ | 382/145 |
| 5,581,632 | A | 12/1996 | Koljonen et al. | |
| 5,717,785 | A * | 2/1998 | Silver .................. | 382/202 |
| 5,832,110 | A * | 11/1998 | Hull ..................... | 382/168 |
| 5,901,241 | A | 5/1999 | Koljonen et al. | |
| 5,930,384 | A * | 7/1999 | Guillemaud et al. ....... | 382/154 |
| 5,943,442 | A * | 8/1999 | Tanaka et al. ........... | 382/216 |
| 6,002,793 | A * | 12/1999 | Silver et al. ............ | 382/152 |
| 6,240,218 | B1 * | 5/2001 | Michael et al. .......... | 382/289 |
| 6,356,300 | B1 * | 3/2002 | Shiba ................... | 348/130 |
| 6,363,168 | B1 * | 3/2002 | Kakuma ................. | 382/151 |
| 6,385,340 | B1 * | 5/2002 | Wilson .................. | 382/218 |
| 6,549,648 | B1 * | 4/2003 | Rinn ..................... | 382/151 |
| 6,594,623 | B1 * | 7/2003 | Wang et al. ............. | 703/1 |
| 6,597,806 | B1 * | 7/2003 | Kawada ................. | 382/151 |
| 6,711,304 | B2 * | 3/2004 | White ................... | 382/289 |

(Continued)

OTHER PUBLICATIONS

Notification Of Transmittal Of The International Search Report And the Written Opinion Of the International Searching Authority, Or the Declaration in PCT/US05/07191.

*Primary Examiner*—Joseph Mancuso
*Assistant Examiner*—Kathleen Yuan
(74) *Attorney, Agent, or Firm*—YoungBasile PC

(57) ABSTRACT

The present invention is operative to determine the angular pose of an assumed object. A series of projection sums are calculated from a sample image of the known object where the known object has an assumed pose. The projection sums are calculated for a range of angles and organized into a two dimensional array coined a projection image. An image of the known object is provided where the known object has an unknown pose. A projection sum is calculated across the image of the known object with the unknown pose preferably at the perpendicular. This projection sum is correlated against the projection image and the angle corresponding to the best correlation is determined to be the angular pose of the known object.

20 Claims, 5 Drawing Sheets

U.S. PATENT DOCUMENTS

| | | | |
|---|---|---|---|
| 6,917,699 B2 * | 7/2005 | Sugawara | 382/151 |
| 6,950,535 B2 * | 9/2005 | Sibayama et al. | 382/113 |
| 6,985,640 B2 * | 1/2006 | Schweid | 382/289 |
| 7,016,539 B1 * | 3/2006 | Silver et al. | 382/216 |
| 7,020,325 B2 * | 3/2006 | Park | 382/154 |
| 7,043,081 B1 * | 5/2006 | Silver et al. | 382/209 |
| 7,065,261 B1 * | 6/2006 | Horie | 382/289 |

* cited by examiner

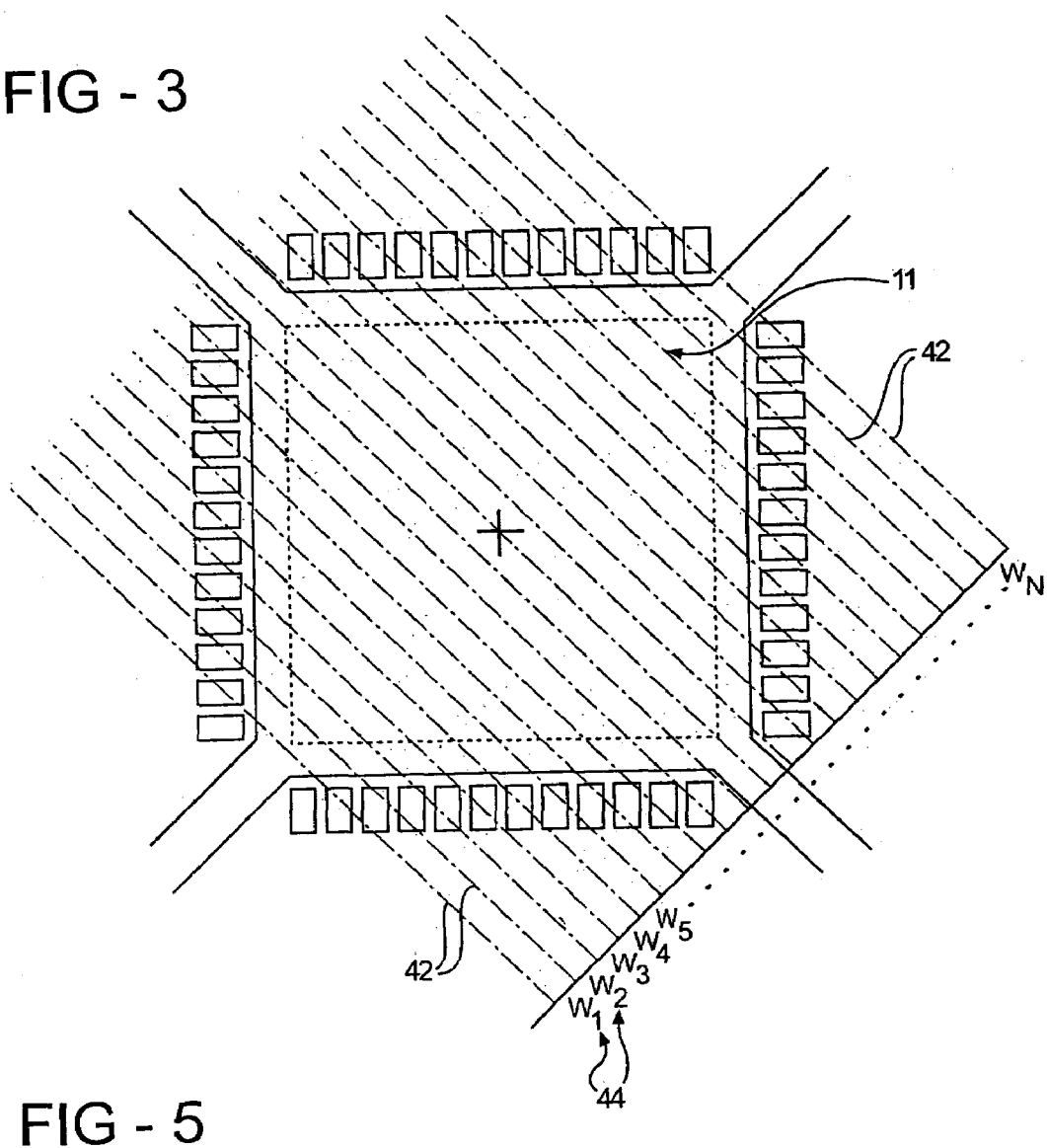

FIG - 7
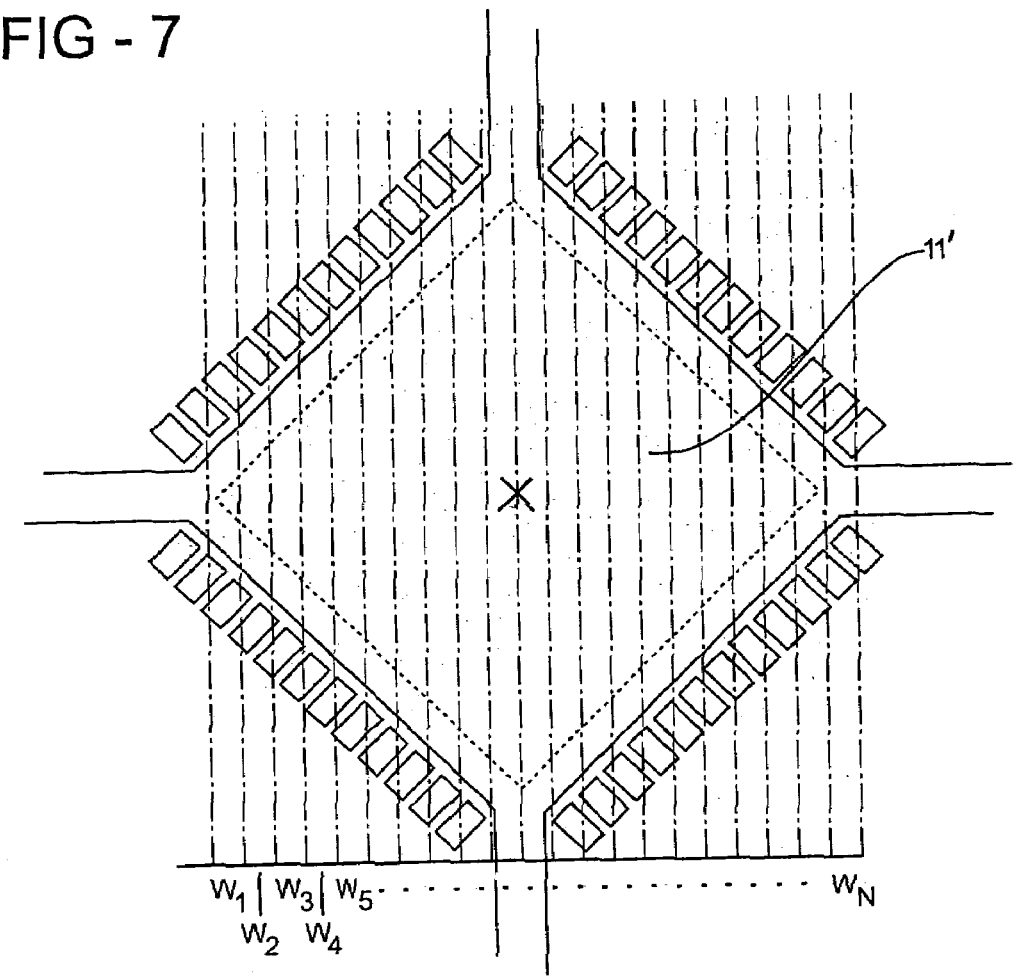
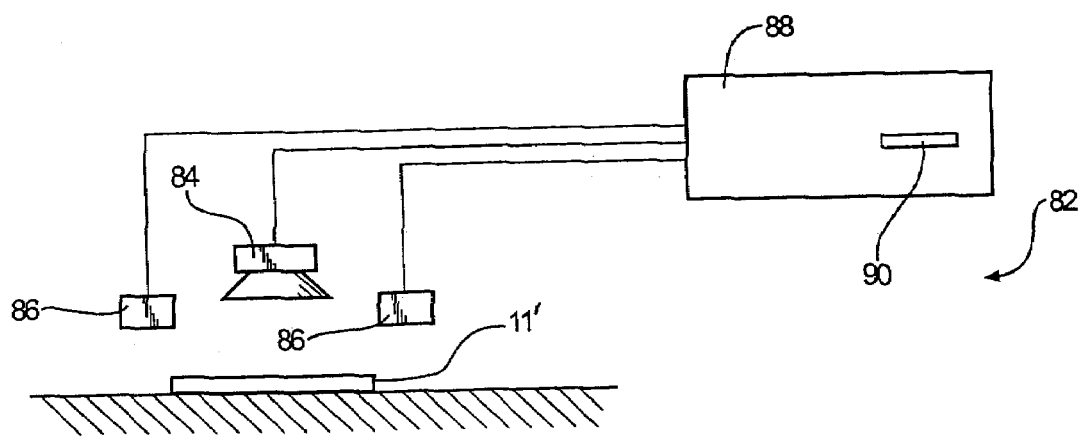
FIG - 9

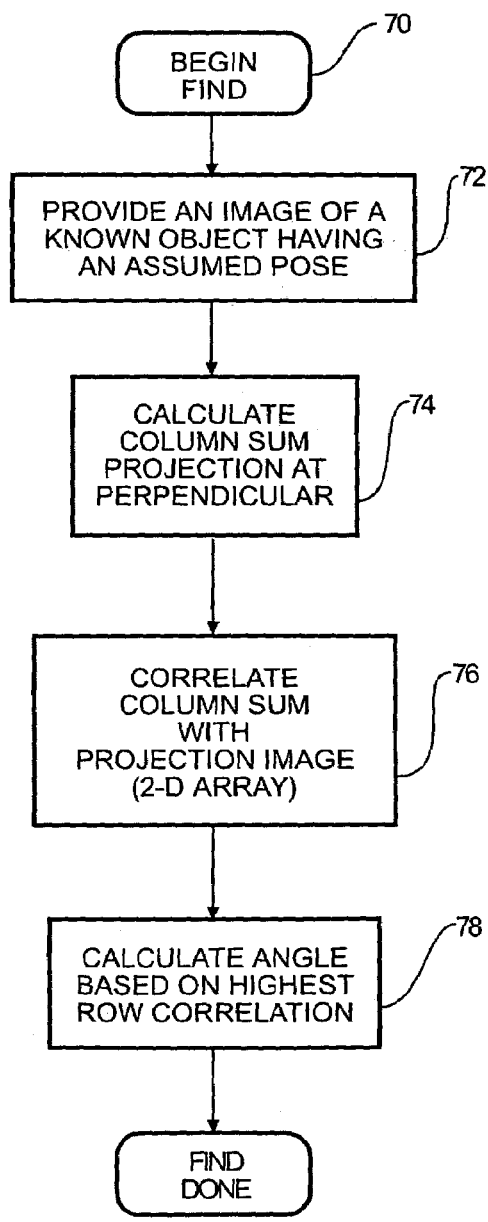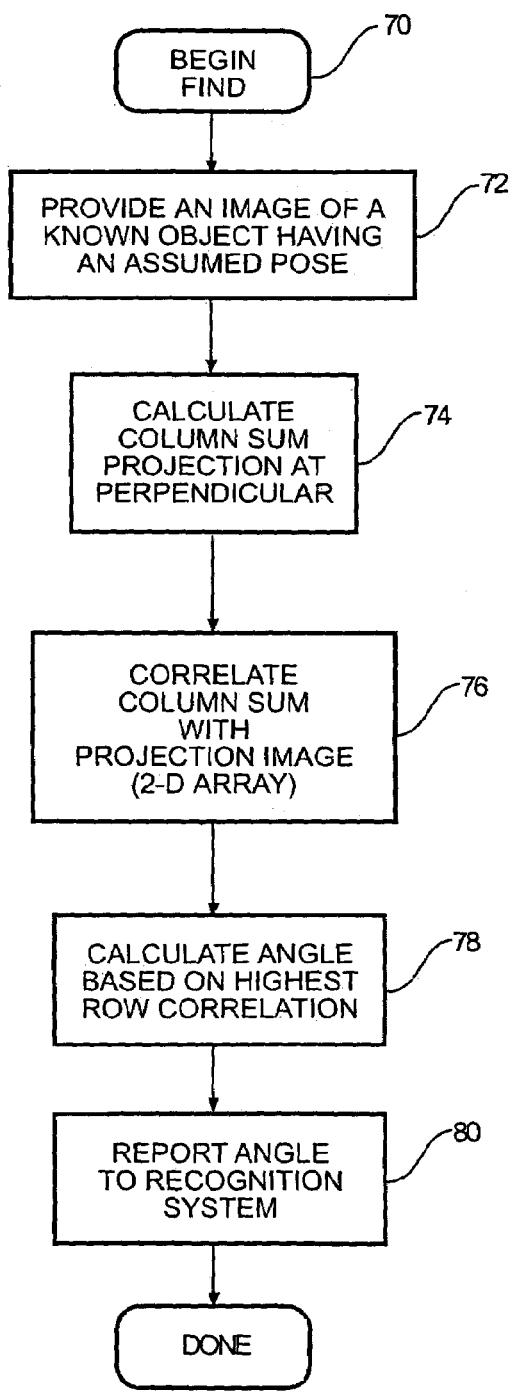

METHOD AND APPARATUS FOR DETERMINING ANGULAR POSE OF AN OBJECT

FIELD OF THE INVENTION

The present invention relates to determining the angular pose of an assumed object.

BACKGROUND OF THE INVENTION

A frequent task in the inspection of manufactured parts is determining the pose of the part. The pose is the location of the part, typically measured by an x and y coordinate together with and an angle as measured from the vertical. The angular pose may be viewed as a measure of how much the part is rotated. In many industrial applications the pose of the part is measured by a machine vision system. This is especially true for semiconductor parts. Knowing the angular pose, a machine vision system can provide important information concerning the quality of a part, can direct manufacturing operations or can improve the accuracy of other machine vision operations.

Determination of the angular pose is often a time intensive operation. With the ever increasing requirements for increased throughput, increasing the speed at which the angular pose is calculated is universally desired.

It is also understood that many pattern recognition algorithms or systems used by machine vision systems are angularly sensitive. In other words, many pattern recognition algorithms or systems do not operate well when the part being inspected is rotated beyond some tolerance. For example, if a part is rotated more than approximately one or two degrees, normalized correlation may not properly function to recognize a part.

The semiconductor industry has dealt with the sensitivity of pattern recognition systems in a variety of ways. One way has been to develop pattern recognition systems which are less sensitive to rotatation, such as gray scale vector correlation (See commonly assigned U.S. Pat. No. 6,385,340 which is incorporated herein by reference). Another way to deal with this sensitivity is to present the semiconductor parts to the vision system in a very controlled manner. For example, semiconductors may be presented to the vision system in a specially configured tray designed to minimize the rotation of the parts. Notwithstanding the two efforts described above parts may be rotated beyond the tolerance of the pattern recognition system which may result in the pattern recognition system reporting a failure for that part.

However, if the angular pose is generally known, pattern recognition systems can be adjusted to properly perform. This would allow known parts to be inspected regardless of rotation. In the past determining the angular pose of an object as a separate processing system and reporting that angular pose to the pattern recognition system was simply too costly as compared to the occasional failure caused by a part being rotated beyond the tolerance of the recognition system being used. Thus a need has arisen to calculate the angular pose of an object quickly and with the desired accuracy.

SUMMARY OF THE INVENTION

The present invention provides a method for calculating the angular pose of an assumed object. This angular pose has an independent value, and may or may not be reported to a pattern recognition system. A sample image of the known object is provided. The sample image has an assumed pose. A series of projection sums are calculated across the sample image of the known object over a range of angles and organized into a two dimensional array based on the angle at which the projection sum was calculated. A first image of an assumed object is provided where the angular pose of the known object in the first image is unknown. A projection sum is calculated across the first image at an assumed angle. The assumed angle is preferably perpendicular. The projection sum from the first image is compared against the two dimensional array and the angle whose projection sum best compares to the projection sum of the first image is selected. The present invention can be performed on a series of images, all of the known objects to report an angular pose associated with each object.

The method of the present invention further provides that the angle whose projection sum best compares to the projection sum of the first image is reported to a recognition system. This will allow the recognition system to be adjusted to account for any rotation in the object. In a further preferred embodiment the recognition system is gray scale vector correlation.

In a further preferred embodiment the comparison of the projection sum across the first image is compared to the two dimensional array using normalized correlation, or NCR.

The present invention also provides for a computer readable medium for use in a machine vision system where the computer readable medium is configured to determine the angular pose of a known object. The computer readable medium includes means for calculating a series of projection sums across a sample image of the known object having an assumed pose. The projection sums are calculated over a range of angles, The computer readable medium further includes a means for organizing the projection sums into a two dimensional array based on the angles at which the projection sum is calculated. The computer readable medium further includes means for calculating a projection sum across a first image from a series of known objects at an assumed angle and comparing the projection sum across the first image against the two-dimensional array. The angle whose projections are best compared to the projection sum of a first image is selected.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a schematic representation of the object of FIG. 1 where the projection sum is being calculated.

FIG. 5 is a schematic representation of the two dimensional array of projection sums organized by angle.

FIG. 6 is a flow chart illustrating the process of finding the angular pose of a known object utilizing the array of FIG. 5.

FIG. 7 is a schematic illustration of a perpendicular projection sum taken across a known object where the known object is at an unknown angle.

FIG. 8 is a flow chart similar to FIG. 6 in which the angular pose of the object is reported to a pattern recognition system.

FIG. 9 is a schematic of a vision system including a computer readable medium configured to determine the angular pose of an object.

DETAILED DESCRIPTION OF THE PREFERRED EMBODIMENT

The present invention is particularly useful for determining the angular pose of a known object. The present invention utilizes a novel modification of Radon's equations (set forth below) to quickly determine the angular pose of a known object. A series of projection sums is determined from a sample image of the known object, where the known object has an assumed pose. The projection sums are calculated for a range of angles. This range can be as large as ±180 degrees.

Each projection sum may be thought of as a one dimensional array. A collection of such one dimensional arrays is calculated to form a two dimensional array of projection sums. This two dimensional array may be coined a projection image.

An image of a known object is presented where the angular pose of the known object is not known. The multiple objects are "known" in the sense that they are all the identical part, which in the example below is a semiconductor die. Preferably, a single projection sum is taken from the perpendicular. This projection sum is then correlated against the two dimensional array of projection sums. The angle associated with the projection sum which correlates the best with the single projection sum is the angular pose of the known object.

The present invention is described in the context of a semiconductor component such as a die. In practice the sample image would come from a known object which could be a specific die. Known objects with the unknown poses would then be dies which are substantially identical, e.g., the same part. The follow-on dies, however, would have an unknown pose.

As discussed above, the present invention is loosely based on the calculation of Radon's equations produced below.

$$R(P, T)[f(x, y)] = \int_{-\infty}^{\infty}\int_{-\infty}^{\infty} f(x, y)\delta[y - T + Px]\,dy\,dx$$

Where f(x,y) is the image data, P is the angle at which the projection is formed and tau is the displacement along the projection.

Figure 1:
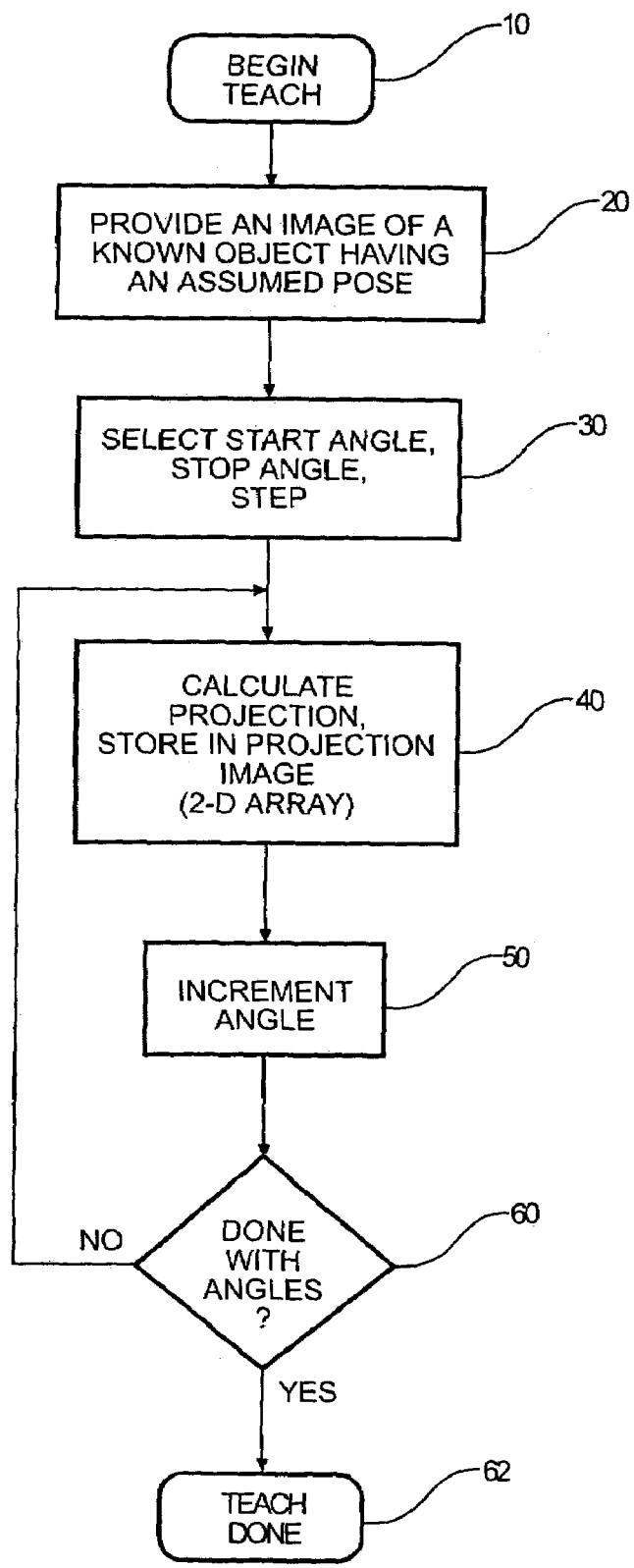
FIG. 1 is a flow chart illustrating how a two dimensional array from a sample image of a known object is taught.

With reference to the drawings where like elements are numbered alike, the method of the present invention is shown. With reference to FIG. 1, the teaching process starts at 10. Teaching describes the task of creating the two dimensional array of projection sums at assumed angles. This two dimensional array may be referred to as a projection image. At 20 an image of a known object having an assumed pose is provided. In the context of describing the present invention this known object is a die. However, the present invention could be used with a wide variety of objects. At 30, the start angle, stop angle and step is selected.

The start and stop angle reference the range over which the projection sums will be calculated.

Figure 2:
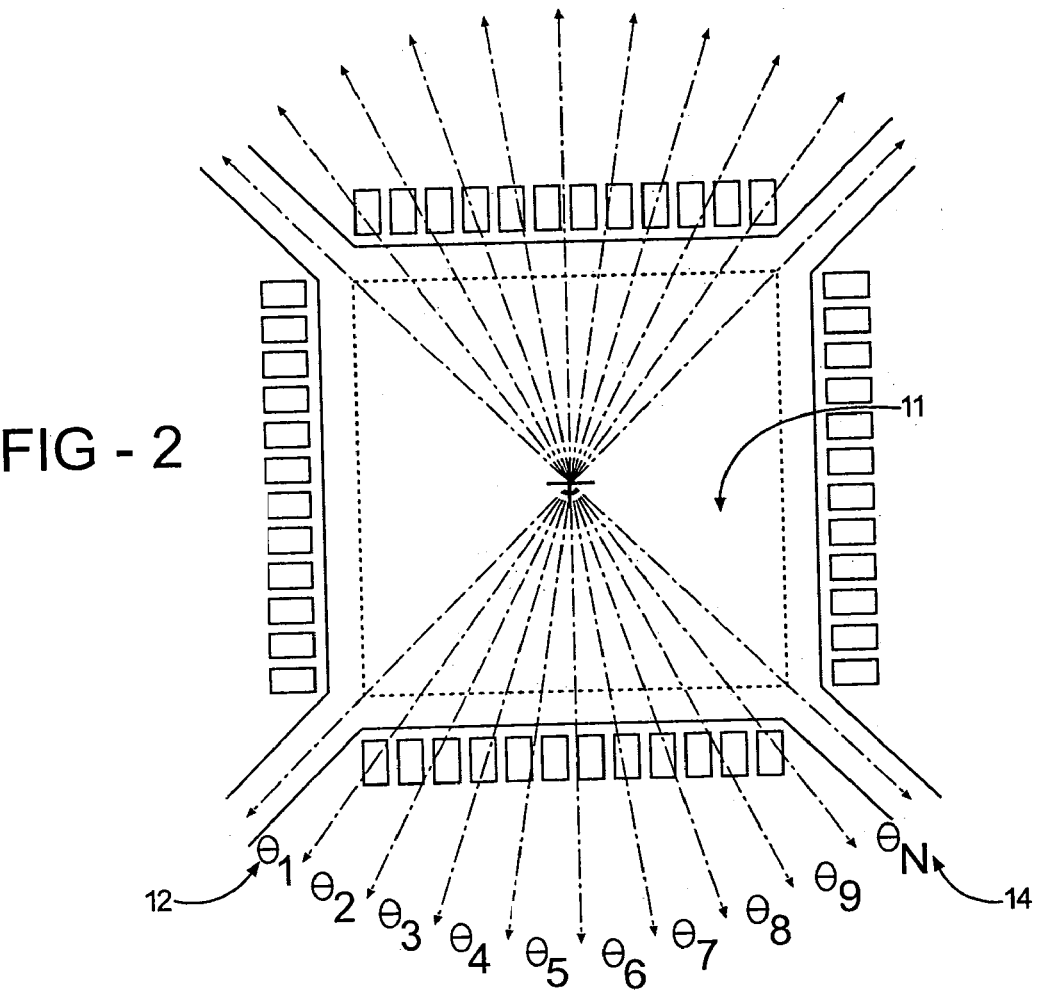
FIG. 2 is a schematic representation of a known object and a series of angles through which projection sums can be calculated.

FIG. 2 schematically illustrates the start and stop angles. FIG. 2 schematically illustrates a collection of angles projected across an image of a die 11. In this example, the die is the known object with the assumed angular pose. The start angle is represented by $\theta_1$ at 12 while the end angle is represented by $\theta_n$ at 14. A preferred range is ±30 degrees although the projections can be taken from ±180 degrees. It is understood that the range of angles through which projection sums will be derived is dependent upon the specific application desired. For example, a range of ±180 degrees will work well with randomly rotated parts and lesser ranges may be better situated for parts presented in trays.

It is also understood that the increment between angles can be different. The increment of angles references the difference between two adjacent projections, for example, $\theta_1$ and $\theta_2$. The increment of angles, as explained more fully below, will vary depending on the accuracy of the angular pose needed. When the pattern recognition system is normalized correlation, the increment between angles should be between half a degree and one degree. However, in the case of a more robust pattern recognition technique such as gray scale vector correlation a higher increment, such as 2.5 degrees may be preferred.

With reference again to FIG. 1, the projection sums are calculated at 40. For any given angle the projection sum is derived in the manner schematically illustrated in FIG. 3. FIG. 3 represents an image of die 11 in which a series of projection summation lines 42 are extended across the image. It is understood that the image of any object including that of the die actually is a collection of pixels, each pixel having a location and value. Projection summation lines 42 represent the idea that the pixel values for each pixel location covered by any individual line 42 is added. The summed values for each line is represented by w1 through wN in FIG. 3 (labeled 44). In the preferred embodiment each projection summation line 42 is one pixel wide.

Figure 4:
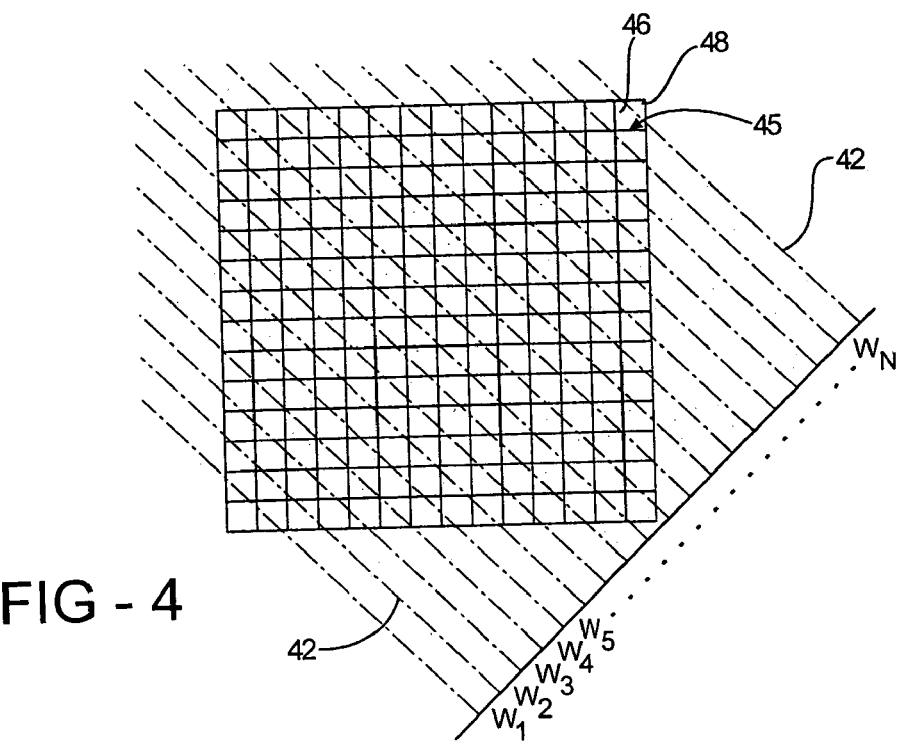
FIG. 4 is a detailed view of the manner in which the projection sum is calculated across representative pixels from FIG. 3.

Because projection summation lines 42 are set at an angle with respect to the pixels, the line may not capture an entire pixel. This is schematically illustrated in FIG. 4. For example, with reference to a sample pixel 45 there is a portion captured by the line shown as 46 and a portion not captured shown as 48. It is understood that the captured portions 46 may be weighted to compensate for the uncaptured portions 48 to thereby provide a more accurate sum.

The angles are incremented at 50 and projection sums are calculated for all angles $\theta_1$ through $\theta_n$ at the predetermined angular increment. When all angles have been exhausted at 60 the teach process ends at 62. The teach process of FIG. 1 yields a projection image schematically illustrated in FIG. 5. The projection image of FIG. 5 is a two dimensional array of projection sums with each row representing a different angle.

With reference to FIGS. 6-8 there is shown the manner in which the angular pose of the known object is determined. The find angular pose operation begins at 70. At 72 an image of a known object, or in this case a die 11', is presented. It is understood that die 11' is intended to be the same as die 11 and the image of die 11' is preferably taken under the same conditions as the image of die 11. The object of the image at 72 has an unknown angular pose. At 74 a projection sum is calculated across the image of the like object at an assumed angle, which is preferably a perpendicular angle. Calculation of the projection sum at a perpendicular angle is schematically illustrated in FIG. 7. At 76 the projection sum derived at 74 is correlated against the two dimensional array shown in FIG. 5. The angle corresponding to the summation row which best correlates to the projection sum calculated at 78.

It is understood, as shown in FIG. 6, once the pose is found the process may be complete. However, as shown in FIG. 8 the pose may be reported to a pattern recognition system such as normalized correlation or gray scale vector correlation at 80. Those pattern recognition systems may then be adjusted to find the pose of the object.

When the range of angles is greater than ±90 degrees the present invention provides for the elimination of any ambiguities associated when correlating the projection sum against the two dimensional array of FIG. 5. These ambiguities may be the result of symmetry within the part. In such instances it may be necessary to take another summation projection at 74 at an off angle and correlate two different projection sums against the two dimensional array of FIG. 5.

With reference to FIG. 9 there is shown a machine vision system 82. Vision system 82 includes a camera 84 and appropriate lighting 86. Camera 84 and lighting 86 are operably attached to a processing unit 88 which includes a computer readable medium 90 configured to determine the angular pose of an object. In the present example the object is a die 11' positioned with the field of view of camera 84.

While the invention has been described in connection with what is presently considered to be the most practical and preferred embodiment, it is to be understood that the invention is not to be limited to the disclosed embodiments. For example, it is understood that the projection sum could be taken at any assumed angle and correlated to against the two dimensional array of FIG. 5. The perpendicular angle was selected to provide a more straightforward process. If an assumed angle other than 90 degrees is applied additional calculation may be used. The instant application is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of calculating an angular pose of a known object comprising:
    providing a sample image of the known object having an assumed pose;
    calculating a series of projection sums across the sample image over a range of different angles about a selected point and organizing the projection sums into a two dimensional array based on the angles at which the projection sums were calculated;
    providing a first image of the known object, the angular pose of the known object shown in the first image being unknown;
    calculating a projection sum across the first image at an assumed angle; and
    comparing the projection sum across the first image against the two dimensional array and selecting the angle whose projection sum best compares to the projection sum of the first image.

2. A method as in claim 1 further comprising:
    reporting the angle whose projection sum best compares to the projection sum of the first image to a recognition system.

3. A method as in claim 2 wherein the recognition system is gray scale vector correlation.

4. A method as in claim 1 wherein the assumed angle is within the range of different angles.

5. A method as in claim 1 wherein the projection sums calculated from the sample image are calculated over the range of angles by incrementing the angles approximately 2.5 degrees.

6. A method as in claim 1 wherein the comparison of the projection sum across the first image and the two dimensional array is NCR.

7. A method as in claim 1 wherein the known object is a semiconductor die.

8. The method of claim 1 wherein calculating the projection sums further comprises extending a plurality of projection summation lines across the sample image for each angle.

9. The method of claim 8 wherein the plurality of projection summation lines are substantially parallel to one another.

10. The method of claim 8 further comprising identifying each pixel value covered by a respective projection summation line and summing the respective pixel values for each projection summation line.

11. The method of claim 10 further comprising weighting the pixel values covered by a respective projection summation line based on an amount of the pixel that is covered by the projection summation line.

12. The method of claim 1 wherein organizing the projection sums in the two dimensional array further comprises establishing a plurality of rows in the two dimensional array, each row including the projection sums for one of the angles at which the projection sum was calculated.

13. The method of claim 1 wherein the range of angles is 90 degrees.

14. The method of claim 1 wherein the assumed angle is at an approximate middle angle value within the range of angles.

15. A computer readable medium for use in a machine vision system, the computer readable medium being configured to determine the angular pose of a known object comprising:
    means for calculating a series of projection sums across a sample image of the known object over a range of different angles about a selected point, the sample image of the known object having an assumed angular pose;
    means for organizing the projection sums into a two dimensional array based on the angles at which the projection sums were calculated;
    means for calculating a projection sum across a first image of the known object, where the known object has an unknown angular pose, the projection sum being calculated at an assumed angle;
    means for comparing the projection sum across the first image against the two dimensional array; and
    means for selecting the angle whose projection sum best compares to the projection sum of the first image.

16. A computer readable medium as in claim 15 further comprising means to report the angular pose to a pattern recognition system.

17. A computer readable medium as in claim 15 wherein the assumed angle is within the range of different angles.

18. A computer readable medium as in claim 15 wherein the projection sums are calculated over the range of angles by increments of approximately 1 degree.

19. A computer readable medium as in claim 15 wherein the range of angles is ±180 degrees.

20. A method of calculating an angular pose of a known object comprising:

providing a sample image of a first known object having an assumed pose;

selecting a start angle and a stop angle about a selected point on the sample image defining a range of different angles between the start angle and the stop angle;

selecting an incremental angle about the selected point based on the pattern recognition technique to be used;

extending a plurality of projection summation lines across the sample image for each angle within the range of angles based on the selected incremental angle;

identifying the pixel values covered by each projection summation line;

calculating a plurality of projection sums of the respective pixel values for each summation line for each angle within the range of angles based on the incremental angle;

organizing the projection sums from the sample image into a two dimensional array having a plurality of rows, each row of the two dimensional array including the projection sums for one of the angles at which the projection sum was calculated;

providing a first image of a second known object, the angular pose of the second known object shown in the first image being unknown;

calculating a projection sum across the first image at an angle within the range of angles used for the sample image; and comparing the projection sum across the first image against the two dimensional array and selecting the angle whose projection sum best compares to the projection sum of the first image.

* * * * *